United States Patent [19]
Petrunka et al.

[11] Patent Number: 5,991,369
[45] Date of Patent: Nov. 23, 1999

[54] SYSTEM AND METHOD FOR MESSAGE DELIVERY FOR NON-PUBLISHED DIRECTORY NUMBERS TO VOICE MAIL BOXES

[75] Inventors: Robert W. Petrunka, Raleigh; Michael Godfrey, Apex, both of N.C.

[73] Assignee: Nortel Networks Corporation, Canada

[21] Appl. No.: 08/870,652

[22] Filed: Jun. 6, 1997

[51] Int. Cl.[6] .................................................. H04M 3/50
[52] U.S. Cl. ...................................... 379/88.25; 379/201
[58] Field of Search ..................................... 379/201, 210, 379/212, 213, 88.18, 88.22, 88.23, 88.25, 88.26

[56] References Cited

U.S. PATENT DOCUMENTS 4,959,855  9/1990  Daudelin .................................. 379/213
5,450,476  9/1995  D'Apuzzo et al. ...................... 379/213

*Primary Examiner*—Daniel S. Hunter
*Attorney, Agent, or Firm*—Finnegan, Henderson, Farabow, Garrett & Dunner, L.L.P.

[57] ABSTRACT

A system and method for directing directory assistance calls allows a caller seeking a non-published number to access a voice mail box associated with the non-published number. If a caller calls directory assistance to request a telephone number determined to be non-published, the call may be routed to an automatic recording indicating that the caller may leave a message. The caller may then leave a voice mail message for delivery to the appropriate party.

23 Claims, 5 Drawing Sheets

------ DATA
——— VOICE

- - - - - - DATA
———— VOICE

| 51 | 52 | 53 | 54 | 55 |
|---|---|---|---|---|
| BUSH, GEORGE | (567) 890-1234 | NON-PUBLISHED | YES | (123) 456-7890 |
| CARTER, JAMES | (234) 567-8901 | NON-PUBLISHED | NO | N/A |
| CLINTON, WILLIAM | (345) 678-9012 | NON-PUBLISHED | YES | (987) 654-3210 |
| DOE, JANE | (456) 789-0123 | PUBLISHED | N/A | N/A |
| DOE, JOHN | (678) 901-2345 | PUBLISHED | N/A | N/A |
| REAGAN, RONALD | (789) 012-3456 | NON-PUBLISHED | YES | (321) 654-0987 |

*FIG.5*

SYSTEM AND METHOD FOR MESSAGE DELIVERY FOR NON-PUBLISHED DIRECTORY NUMBERS TO VOICE MAIL BOXES

BACKGROUND OF THE INVENTION

The present invention relates generally to the delivery of telephone messages to voice mail boxes, and more particularly to the delivery of telephone messages to voice mail boxes associated with non-published phone numbers.

Directory Assistance Systems have been widely used in telephone networks. The systems allow callers to request and receive directory numbers for businesses, residences, and government offices.

FIG. 1 shows a typical call flow for a directory assistance (DA) call. A caller 10 first dials a DA number such as 411 or 555-1212. Caller 10 is routed through local switch 11 to an Operator Services Switch 12. An operator 13, having both a data and voice connection to Operator Services Switch 12, receives information supplied by caller 10 identifying a desired listed party. Operator 13 sends to a DA database 14 information received from caller 10, and receives back from DA database 14 a list of possible matches corresponding to the supplied information. Operator 13 then selects, either on his own or through communication with caller 10, the desired party from the list and transmits this selection back to DA database 14. DA database 14 then instructs Operator Services Switch 12 to terminate the link with operator 13 and establish a voice connection between caller 10 and an automatic recording unit (ARU) 15. Finally, DA database 14 provides ARU 15 with the selected phone number and ARU 15 plays an announcement including the directory listing number. When the directory listing is non-published, ARU 15 plays an announcement indicating that fact to caller 10, at which point caller 10 hangs up.

For non-published numbers, the caller cannot directly contact the desired party, which is one of the purposes of having a non-published number. The non-published party may, however, wish to allow people to contact him indirectly, such as by leaving a voice mail.

Conventional voice mail systems cannot allow such contact. A typical voice mail system is shown in FIG. 2. A caller 20 attempts to call party 28 via local switches 21 and 27. If called party 28 does not answer, or if the line is busy, local switch 27 forwards the call to voice mail (VM) system 29. Using the number of called party 28, VM system 29 connects caller 20 to the voice mail box of called party 28 to leave a message.

To retrieve his voice mail, called party 28 places a call via local switch 27 to VM system 29. VM system 29 uses the calling number of called party 28 to identify the correct voice mail box. Alternatively, VM system 29 may prompt called party 28 to enter a voice mail box number and a password. Then, VM system 29 plays the messages contained in the mail box.

Currently, however, no system exists to combine current VM systems with DA systems to allow a caller to leave a message in a voice mail box associated with a non-published number. There is, therefore, a need for a system and method to allow a caller using a directory assistance service to leave a voice mail message for parties with non-published numbers in lieu of contacting them directly. Such a system and method should work both in pre-local number portability and local number portability environments.

SUMMARY OF THE INVENTION

Systems and methods consistent with the present invention substantially obviate problems and disadvantages that accompany current directory assistance systems by routing calls to mail boxes associated with non-published numbers.

In accordance with the purpose of the invention, as embodied and broadly described, a system consistent with this invention includes means for receiving a directory assistance call from a caller to a destination, means for determining that the destination is a non-published directory number, means for determining whether a voice mail box is associated with the non-published directory number, and means for routing the call to the associated voice mail box.

A method consistent with this invention includes the steps of receiving a directory assistance call from a caller to a destination, determining that the destination is a non-published directory number, determining whether a voice mail box is associated with the non-published directory number, and routing the call to the associated voice mail box.

A services computer consistent with this invention includes means for obtaining a non-published dialed number and an associated voice mail system number, means for accessing a voice mail system according to the voice mail system number, means for accessing a voice mail box according to the non-published dialed number, and means for establishing a connection between a caller and the accessed voice mail box.

A database consistent with this invention includes a list of names, a phone number associated with each name in the list, a first flag indicating whether the phone number is non-published, and a second flag associated with each non-published number indicating whether to route messages to an associated voice mail box.

Other features and advantages of the invention will be set forth in the description which follows, and in part will be apparent from the description, or may be learned by practice of the invention. The objectives and other advantages of the invention will be realized and attained by the system and method particularly pointed out in the written description and claims hereof as well as the appended drawings.

Both the foregoing general description and the following detailed description are exemplary and explanatory only, and are intended to provide further explanation of the invention as claimed. The accompanying drawings provide a further understanding of the invention and are incorporated in and constitute a part of this specification. They illustrate embodiments of the invention, and together with the description serve to explain the principles of the invention.

BRIEF DESCRIPTION OF THE DRAWINGS

FIG. 5 is a drawing of a database containing information consistent with the present invention.

DETAILED DESCRIPTION

Reference will now be made in detail to a present preferred embodiment consistent with the invention, an example of which is illustrated in the accompanying drawings. Wherever possible, the same reference numbers will be used throughout the drawings to refer to the same or like parts.

The combination of existing voice mail services and directory assistance services to allow callers to leave voice mail messages in mail boxes associated with non-published numbers is made possible by various modifications to existing system components, and by adding a services computer to the network. The system functions in both Local Number Portability (LNP) and pre-LNP environments. The details of the invention are described in detail below.

Figure 1:
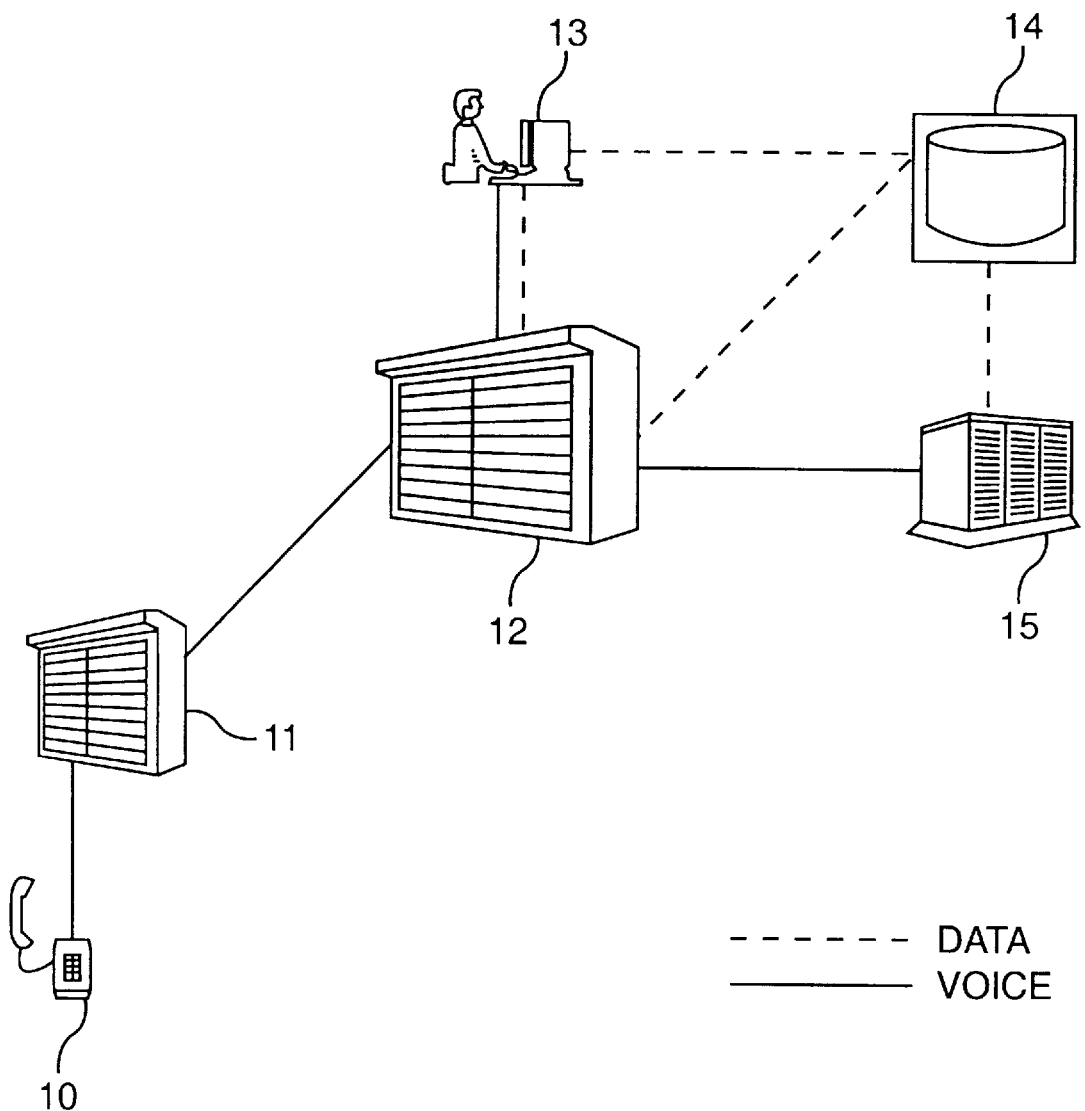
FIG. 1 is a diagram showing a typical directory assistance system.
Figure 2:
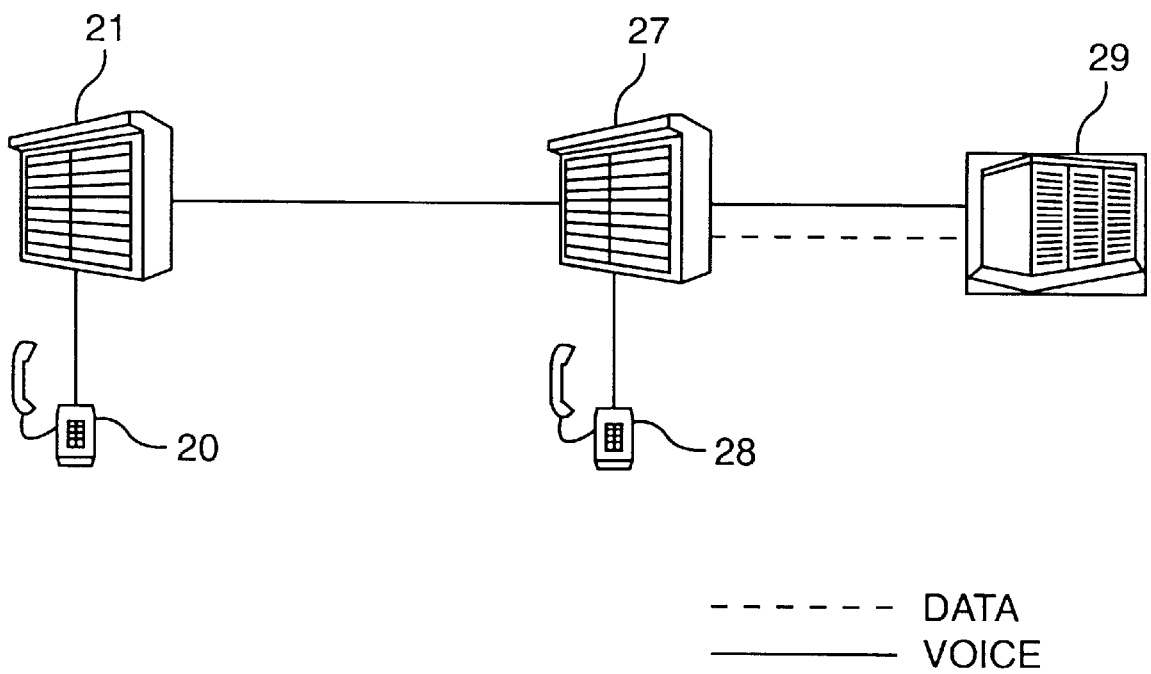
FIG. 2 is a diagram showing a typical voice mail system.
Figure 3:
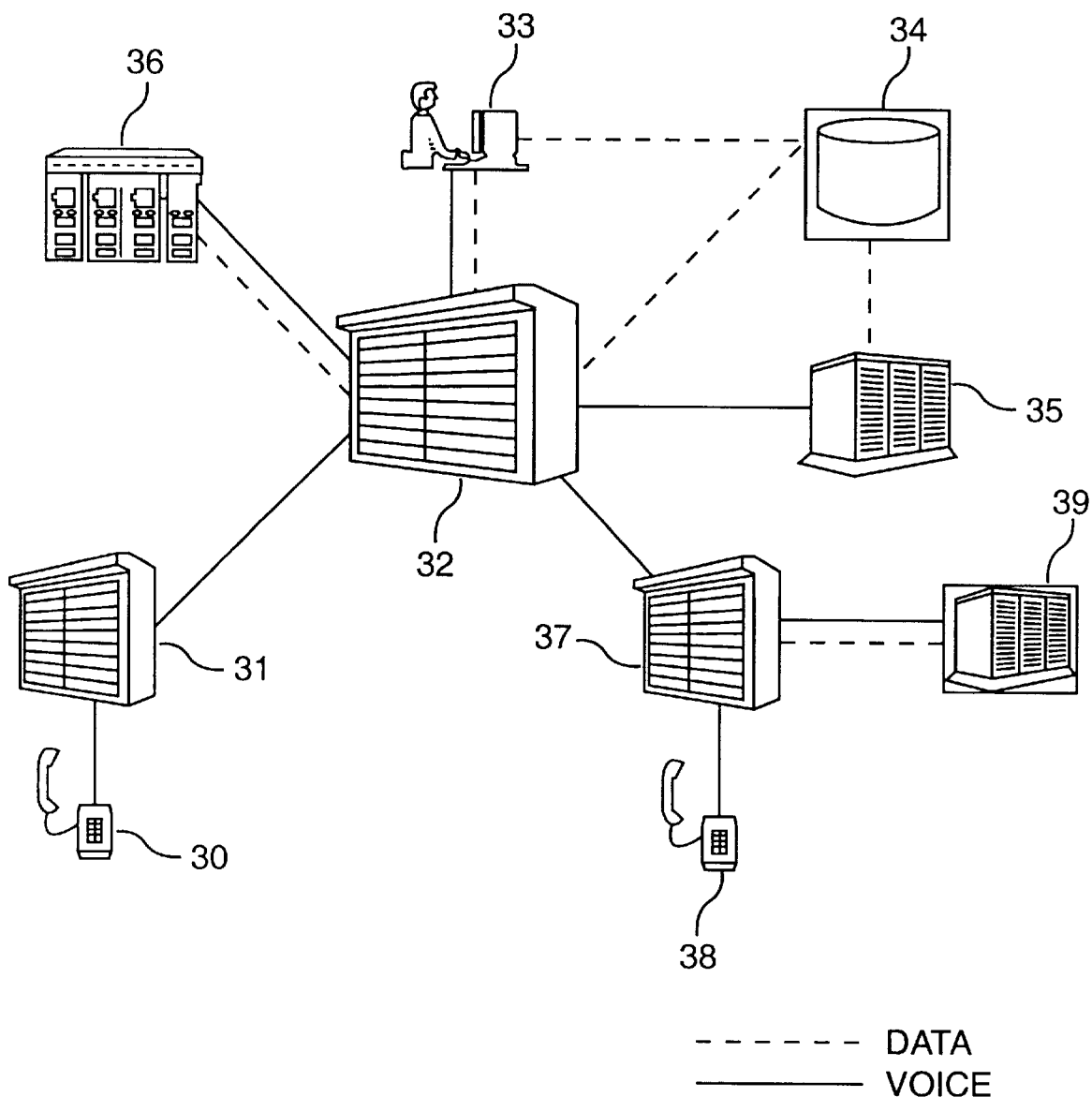
FIG. 3 is a diagram showing a network consistent with the present invention.

FIG. 3 shows a system consistent with the present invention. The system includes a caller 30 linked to a local switch 31 which, in turn, is linked to an Operator Services Switch 32. Operator Services Switch 32 is linked to an operator 33, a directory assistance (DA) database 34, an automatic recording unit (ARU) 35, and a services computer 36. Operator 33 is linked to DA database 34 which is linked to ARU 35. Operator Services Switch 32 is also linked to a local switch 37 which is linked to both a party 38 and a voice mail system 39.

Figure 4:
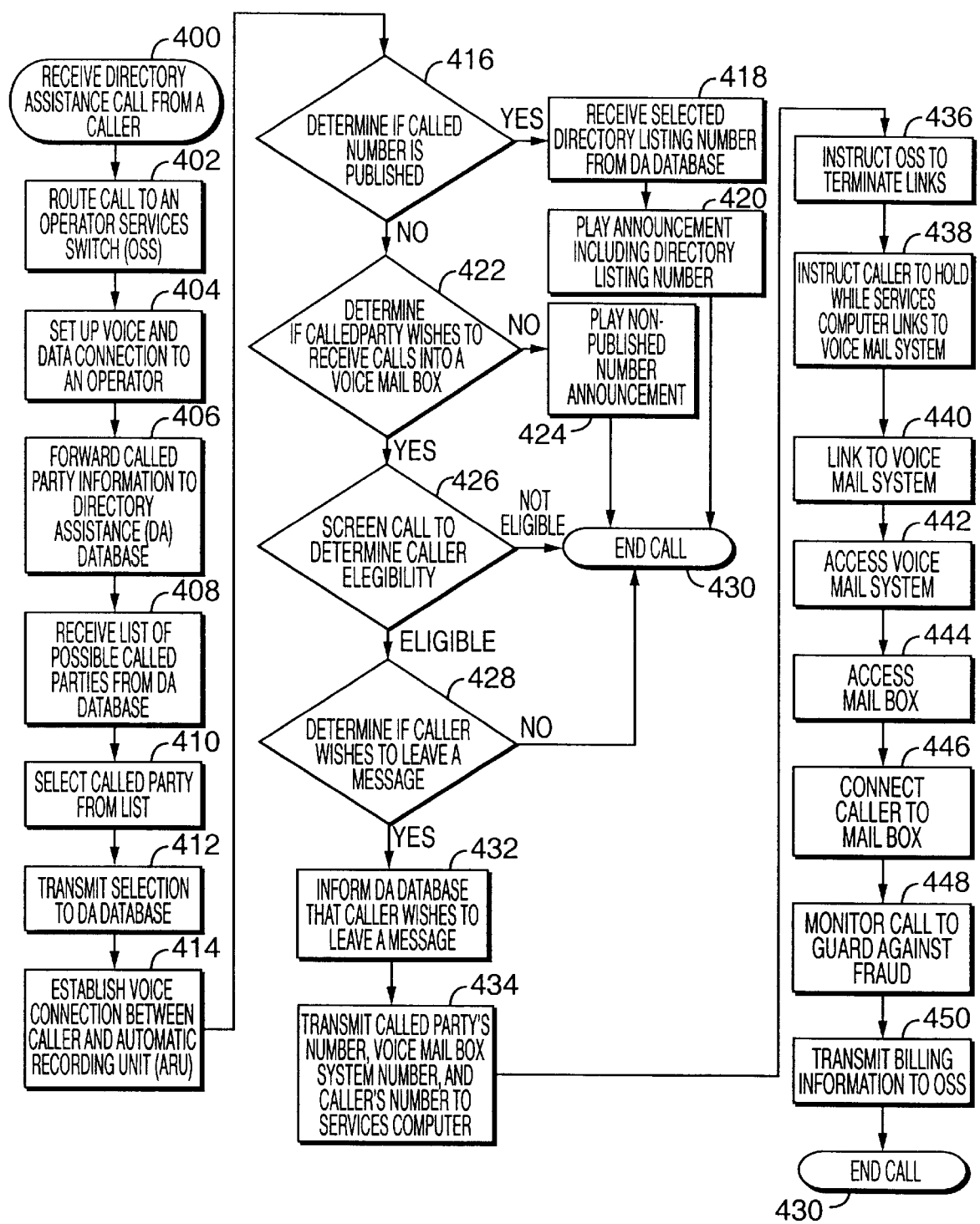
FIG. 4 is a flow chart showing the steps for routing a directory assistance call for a non-published number to a voice mail box consistent with the present invention.

The system operates as shown in the flow chart of FIG. 4. Caller 30 makes a directory assistance (DA) call, for example, by dialing 411 or 555-1212 (step 400). This call is routed through local switch 31, or any number of switches, to Operator Services Switch 32 (step 402). Operator Services Switch 32 sets up a voice and data connection to operator 33 (step 404). Operator 33 forwards to a DA database 34 information provided by caller 30, such as the last name or street address of a listed party (step 406). Based on that information, DA database 34 provides operator 33 with listings matching the provided information (step 408). Operator 33 then selects a listed party 38, with the assistance of the calling party, if necessary (step 410). Operator 33 transmits this selection back to DA database 34 (step 412), which then instructs Operator Services Switch 32 to terminate the link with operator 33 and establish a voice connection between caller 30 and an automatic recording unit (ARU) 35 (step 414).

Consistent with the present invention, DA database 34 is enhanced with additional information about listed parties. FIG. 5 shows such a database of names in field 51. Each number in field 52 has an associated indicator 53 to specify whether the number is non-published. The database is enhanced to include an indicator flag 54 associated with each non-published number specifying whether the listed party having that number wishes to have his DA calls directed to his voice mail box. DA database 34 is also enhanced to include the direct number 55 to the voice mail system used to store messages for the listed party with the non-published number.

If the number that caller 30 has requested is a published number (step 416), DA database 34 provides ARU 35 with the selected phone number (step 418), and ARU 15 plays an announcement including the directory listing number (step 420). If the number caller 30 has requested is a non-published number (step 416), DA database 34 checks the indicator associated with that number to determine whether the listed party wishes to have his calls directed to his voice mail box (step 422). If the indicator is no, ARU 15 plays the existing non-published number announcement (step 424).

If the indicator is yes, DA database 34 "screens" the call to determine whether caller 30's number is eligible to use this voice mail delivery service (step 426). For example, if a charge is associated with the service, some employers may not want their employees to be able to access the service. To screen the call, DA database 34 consults tables of numbers found in Operator Services Switch 32. Alternatively, this information can be located in an external database such as a Line Information Database (LIDB).

If the call passes the screening, DA database 34 instructs ARU 15 to play a different announcement asking caller 30 if he would like to leave a message in a voice mail box for the called party (step 428). Caller 30 answers the query by speaking "yes" or "no" or by keying an indicated dual tone multi-frequency (DTMF) digit. If caller 30 does not wish to leave a voice message, the call ends (step 430).

If caller 30 indicates that he would like to leave a message, ARU 35 communicates this information to DA database 34 (step 432). DA database 34 then transmits the listed party's non-published number, the direct voice mail box system number, and caller 30's phone number through Operator Services Switch 32 to services computer 36 (step 434). DA database 34 also instructs Operator Services Switch 32 to terminate its links with DA database 34 and ARU 35 (step 436).

At this point, caller 30 has a voice link to services computer 36 through Operator Services Switch 32. Services computer 36 preferably instructs caller 30 to hold while services computer 36 establishes a link to voice mail system 39 (step 438). Services computer 36 could also play music for caller 30 while he waits.

Services computer 36, using the direct voice mail box system number provided to it, then establishes a link through the Public Switched Telephone Network (PSTN) to voice mail system 39 (step 440). While only one switch 37 is shown, it is likely that the call from services computer 36 to voice mail system 39 will proceed through a series of switches.

Services computer 36 then gains access to voice mail system 39 by providing system 39 with any necessary access information, such as a password (step 442). This, access information remains the same for every call services computer 36 places to voice mail system 39 and, for that reason, is stored in services computer 36 during initial setup and configuration. After accessing voice mail system 39, services computer 36 then provides system 39 with the necessary codes to leave a message in a voice mail box (step 444). The voice mail box number is typically the last four digits of a phone number. Because services computer 36 has the non-published number, it can access the correct mail box. Services computer 36 then instructs Operator Services Switch 32 to connect caller 30 to the accessed voice mail box (step 446). Caller 30 can then leave a message for the called party.

Services computer 36 performs two remaining functions. First, it monitors the length of the call between caller 30 and voice mail system 39 to guard against fraudulent use of the system (step 448). Second, it provides Operator Services Switch 32 with standard billing information along with information indicating the type of service provided (step 450). Operator Services Switch 32 records this information as part of its standard billing procedures.

The above described system could also be implemented by storing the voice mail system number in services computer 36 or in another database such as an Advanced Intelligent Network (AIN) Service Control Point (SCP) (not shown). In this latter implementation, services computer 36 would instruct Operator Services Switch 32 to signal the non-published number on a dedicated trunk to a telephone switch with AIN capability. At this switch, AIN functionality would retrieve the voice mail system number based on the non-published number provided by Operator Services Switch 32. The AIN SCP would then instruct the switch to set up a connection to the non-published subscriber's voice mail system. The remainder of the call would proceed as described above, but the call would be under the control of the AIN SCP instead of services computer 36.

It will be apparent to those skilled in the art that various modifications and variations can be made in the examples shown without departing from the spirit or scope of the present invention. The present invention covers the modifications and variations of this invention provided they come within the scope of the appended claims and their equivalents.

We claim:

1. A method for delivering a message to a voice mail box of a listed party with a non-published directory number comprising the steps of:

receiving a directory assistance call from a caller to a destination;

determining that the destination is a non-published directory number;

determining whether a voice mail box is associated with the non-published directory number;

routing the call to the associated voice mail box; and screening the call to determine if the caller is eligible to use message delivery.

2. The method of claim 1 wherein the step of determining whether a voice mail box is associated with the non-published directory number includes the step of checking a directory assistance database for an indicator to determine whether to route messages for the listed party to the associated voice mail box.

3. The method of claim 1 wherein the receiving step includes the steps of receiving the directory assistance call at a local switch;

directing the directory assistance call to an operator services switch;

connecting the directory assistance call to an operator through the operator services switch;

receiving information from the caller identifying a listed party; and accessing a database to retrieve the listed party's number based on the information.

4. The method of claim 1 wherein the step of determining that the destination is a non-published directory number includes the step of receiving from a directory assistance database an indication that the requested number is non-published.

5. The method of claim 1 wherein the routing step includes the steps of reading from a database a number to a voice mail system associated with the non-published number; and accessing the voice mail box using the number to the voice mail system and the non-published number.

6. The method of claim 5 wherein the accessing step includes the step of transmitting the non-published number and the voice mail system number to a services computer to access the voice mail box associated with the listed party.

7. The method of claim I further including the step of maintaining billing information.

8. The method of claim 7 wherein the maintaining step includes the step of providing an operator services switch with billing information.

9. The method of claim 7 wherein the maintaining step includes the step of providing an operator services switch with information indicating a type of service provided.

10. A method for delivering a message to a voice mail box of a listed party with a non-published directory number comprising the steps of:

receiving a directory assistance call from a caller to a destination;

determining that the destination is a non-published directory number;

determining whether a voice mail box is associated with the non-published directory number;

routing the call to the associated voice mail box; and monitoring the call to the voice mail box for evidence of fraud.

11. A system for delivering a message to a voice mail box of a listed party with a non-published directory number, comprising means for receiving a directory assistance call from a caller to a destination;

means for determining that the destination is a non-published directory number;

means for determining whether a voice mail box is associated with the non-published directory number;

means for routing the call to the associated voice mail box; and means for screening the call to determine if the caller is eligible to use message delivery.

12. The system of claim 11 wherein the means for determining whether a voice mail box is associated with the non-published directory number includes means for checking a directory assistance database for an indicator to determine whether to route messages for the listed party to the associated voice mail box.

13. The system of claim 11 wherein the receiving means includes a local switch;

an operator services switch linked to the local switch and to an operator;

a directory assistance database linked to the operator and to the operator services switch;

means for receiving information from the caller identifying a listed party; and means for accessing the directory assistance database to retrieve the listed party's number based on the information.

14. The system of claim 11 wherein the means for determining that the destination is a non-published directory number includes means for receiving from a directory assistance database an indication that the requested number is non-published.

15. The system of claim 11 wherein the routing means includes means for reading from a database a number to a voice mail system associated with the non-published number; and means for accessing the voice mail box using the number to the voice mail system and the non-published number.

16. The system of claim 15 wherein the accessing means includes means for transmitting the non-published number and the voice mail system number to a services computer to access the voice mail box.

17. The system of claim 11 further including means for maintaining billing information.

18. The system of claim 17 wherein the maintaining means includes
- means for providing an operator services switch with billing information.

19. The system of claim 17 wherein the maintaining includes means for providing an operator services switch with information indicating a type of service provided.

20. A system for delivering a message to a voice mail box of a listed party with a non-published directory number, comprising
- means for receiving a directory assistance call from a caller to a destination;
- means for determining that the destination is a non-published directory number;
- means for determining whether a voice mail box is associated with the non-published directory number;
- means for routing the call to the associated voice mail box; and
- means for monitoring the call to the voice mail box for evidence of fraud.

21. A services computer for delivering a message to a voice mail box of a listed party with a non-published directory number comprising the steps of:
- means for obtaining a non-published dialed number and an associated voice mail system number;
- means for accessing a voice mail system according to the voice mail system number;
- means for accessing a voice mail box according to the non-published dialed number;
- means for establishing a connection between a caller and the accessed voice mail box; and
- means for monitoring the connection for evidence of fraud.

22. The services computer of claim 21 further including
- means for reporting billing information to an operator services switch.

23. In a system for delivering a message to a voice mail box of a listed party with a non-published directory number, a database comprising:
- a list of names;
- a phone number associated with each name in the list;
- a first flag indicating whether the phone number is non-published; and
- a second flag associated with each non-published number indicating whether to route messages to an associated voice mail box a third flag indicating whether a caller is eligible to use message delivery.

* * * * *

UNITED STATES PATENT AND TRADEMARK OFFICE
CERTIFICATE OF CORRECTION

PATENT NO. : 5,991,369

DATED : November 23, 1999

INVENTOR(S) : ROBERT W. PETRUNKA ET AL.

It is certified that error appears in the above-identified patent and that said Letters Patent is hereby corrected as shown below:

Claim 7, col. 5, line 59, change "claim I" to --claim 1--;

Claim 23, col. 8, line 23, change "voice mail box a third flag indicating whether a caller " to --voice mail box; a third flag indicating whether a caller--.

Signed and Sealed this

Twenty-third Day of May, 2000

Attest:

Q. TODD DICKINSON

*Attesting Officer*      *Director of Patents and Trademarks*